Figure 1:
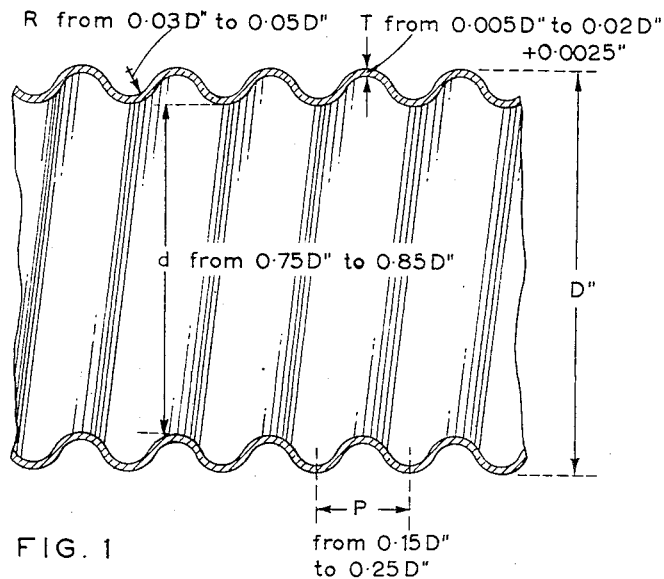

Jan. 27, 1959     J. R. PENROSE     2,870,792
METAL TUBES OR METAL SHEATHS OF ELECTRIC CABLES
Filed March 5, 1957

JAMES RONALD PENROSE
INVENTOR
by *Eugene E. Stevens*
ATTORNEY

United States Patent Office 2,870,792
Patented Jan. 27, 1959

2,870,792
METAL TUBES OR METAL SHEATHS OF ELECTRIC CABLES

James Ronald Penrose, Watford, England, assignor to Pirelli-General Cable Works Limited, London, England, a British company Application March 5, 1957, Serial No. 644,123

Claims priority, application Great Britain March 7, 1956

2 Claims. (Cl. 138—50)

The present invention relates to metal tubes or metal sheaths of electric cables which are corrugated circumferentially or helically and referred to in the following description and claims comprehensively as metal tubing.

According to patent application No. 389,428, filed October 30, 1953, abandoned, relating to metal tubes and patent application No. 398,856, filed October 30, 1953, relating to corrugated aluminium tube and electric cable employing the same as a sheath, the said application subsequently having matured into United States Letters Patent No. 2,817,363 dated December 24, 1957, the corrugations of such tube or sheath, as the case may be, are specified as having certain dimensions, the object being to ensure that the tube or sheath, especially when made of aluminium or soft aluminium aloy, shall be capable of withstanding certain mechanical bending tests recognized as standard practice for tubes or sheaths of this nature.

For certain purposes, however, it is desirable to employ a material possessing a hardness or tensile strength greater than that of aluminium or soft aluminium alloy, and the present invention is concerned with metallic tubing made of hard aluminium aloy or mild steel, that is to say, of a material possessing a tensile strength of from 7 to 25 tons per square inch. By employing such materials it is possible to make the metallic tubing of materially reduced thickness, while possessing equal strength and ability to withstand the required tests above referred to, whereby economy is effected.

According to the invention, in metallic tubing having circumferential or helical corrugations, the interior root diameter of the corrugations is arranged to lie between 0.75 and 0.85 of the exterior crest diameter, the pitch of the corrugations is between 0.15 and 0.25 of the exterior crest diameter and the thickness of the tube wall is between 0.005 and 0.02 of the exterior crest diameter measured in inches, plus 0.0025 inch. It will be noted that the wall thickness as calculated above may be as little as one-quarter of the corresponding dimension accord to either of the above-mentioned prior applications, this procedure being rendered possible by reason of the employment of a metal which is relatively hard and possesses greater tensile strength. By adopting the proportions above specified as regards the interior root diameter and pitch, it is found feasible to corrugate tubing, made of metal having the above-mentioned properties, without material alteration in the wall thickness. Electric cable sheathing made in this manner is particularly suitable for pressure-type cables filled with oil or gas.

Corrugated tubing according to the present invention may be made in any appropriate manner, employing, for instance, any of the methods or apparatus mentioned in the above applications.

The above variations in pitch of corrugations permissible according to the invention allow the use of a single pitch for two or more sizes of tubing, adjacent sizes differing by, say, 10 percent, by reason of which economy in the apparatus required for the manufacture of a range of sizes may be practised. A similar result follows from permissible variation in the radius of the working portion of the corrugating tool: such variation may lie between 0.03 and 0.05 of the exterior crest diameter, so that a given tool may be employed for two or more sizes of tubing.

Likewise the specified permissible variation in the interior root diameter of the corrugations as compared with the exterior crest diameter allows of the formation of corrugations of different depths from one size of plain cylindrical tubing: for instance, in the production of sheathed cables, wherein normally the roots of the corrugations will bear on the enclosed cable core, sheaths suitable for several diameters of core may be manufactured from cylindrical stock of a single size.

Figure 2:
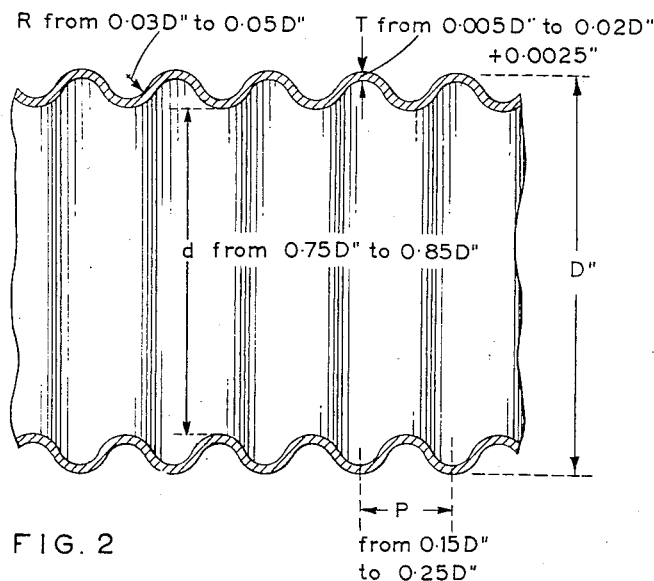

The invention is illustrated in the accompanying drawing showing in longitudinal section two forms of circumferentially corrugated tubing: in Figure 1 the corrguations run helically and in Figure 2 they are at right angles to the axis of the tube.

In each of the figures, the permissible ranges of the interior root diameter $d$, the pitch $P$, the thickness $T$ and the exterior root diameter $R$ are indicated as in relationship to the exterior crest diameter $D$ expressed in inches.

What I claim and desire to secure by Letters Patent of the United States is:

1. Circumferentially corrugated metal tubing of a metal having a tensile strength of from 7 to 25 tons per square inch, wherein the interior root diameter of the corrugations lies between 0.75 and 0.85 of the exterior crest diameter, the pitch of the corrugations is between 0.15 and 0.25 of the exterior crest diameter and the thickness of the tube wall is between 0.005 and 0.02 of the exterior crest diameter measured in inches, plus 0.0025 inch.

2. Circumferentially corrugated metal tubing as in claim 1, wherein the exterior root radius of the corrugations lies between 0.03 and 0.05 of the exterior crest diameter.

References Cited in the file of this patent

UNITED STATES PATENTS

| | | |
|---|---|---|
| 1,919,254 | Picece et al. | July 25, 1933 |
| 2,365,181 | Fentress | Dec. 19, 1944 |

OTHER REFERENCES

"Rex-Flex," Chicago Metal Hose Corp., received Dec. 23, 1940. (Copy in Division 11.)